(12) United States Patent
Bref et al.

(10) Patent No.: US 10,192,017 B2
(45) Date of Patent: Jan. 29, 2019

(54) DRIFT COMPENSATION

(71) Applicant: Teledyne Signal Processing Devices Sweden AB, Linköping (SE)

(72) Inventors: Frida Bref, Linköping (SE); Mikael Gustavsson, Linköping (SE); Per Löwenborg, Linköping (SE); Martin Olsson, Linköping (SE)

(73) Assignee: Teledyne Signal Processing Devices Sweden AB, Linköping (SE)

( * ) Notice: Subject to any disclaimer, the term of this patent is extended or adjusted under 35 U.S.C. 154(b) by 0 days.

(21) Appl. No.: 15/569,931

(22) PCT Filed: Apr. 28, 2015

(86) PCT No.: PCT/SE2015/050476
§ 371 (c)(1),
(2) Date: Oct. 27, 2017

(87) PCT Pub. No.: WO2016/175688
PCT Pub. Date: Nov. 3, 2016

(65) Prior Publication Data
US 2018/0157780 A1    Jun. 7, 2018

(51) Int. Cl.
*H03M 1/10*   (2006.01)
*G06F 17/50*  (2006.01)
(Continued)

(52) U.S. Cl.
CPC .......... *G06F 17/5063* (2013.01); *H03F 1/30* (2013.01); *H03F 1/32* (2013.01); *H03F 1/3223* (2013.01);
(Continued)

(58) Field of Classification Search
CPC .......... G06F 17/5063; G06F 2217/02; H03H 21/0067; H03H 21/0043
See application file for complete search history.

(56) References Cited

U.S. PATENT DOCUMENTS

2004/0248516 A1   12/2004  Demir et al.
2014/0266433 A1    9/2014  Nobbe et al.
(Continued)

FOREIGN PATENT DOCUMENTS

EP       2158680 A1     3/2010
WO    2010069365 A1     6/2010
(Continued)

OTHER PUBLICATIONS

International Preliminary Report on Patentability for International Application PCT/SE2015/050476, dated Jul. 14, 2017, 23 pages.

*Primary Examiner* — Vuthe Siek
*Assistant Examiner* — Aric Lin
(74) *Attorney, Agent, or Firm* — Brake Hughes Bellerman LLP

(57) ABSTRACT

Each realization of an electric circuit design defines a frequency response. For a test lot of the design, frequency responses are measured, each at a stable value of an environment parameter, wherein the totality of the values are distributed over a parameter range. Based on the measurements, a design-specific model is defined that describes a frequency response of the design in dependence of the environment parameter. For a unit in a main lot of realizations of the design, a unit-specific frequency response is measured at a stable value of the environment parameter; the model is fitted to the response, whereby a unit-specific model is obtained; data representing the unit-specific model is stored in association with the unit; and the unit is operated in conjunction with a compensation stage configured to determine a present value of the environment parameter and compensate drift in relation to a parameter-independent reference frequency response.

19 Claims, 9 Drawing Sheets

(51) Int. Cl.
  *H03F 1/30*    (2006.01)
  *H03F 1/32*    (2006.01)
  *H03F 3/08*    (2006.01)
  *H03F 3/195*   (2006.01)
  *H03M 1/12*    (2006.01)

(52) U.S. Cl.
  CPC ............... *H03F 3/08* (2013.01); *H03F 3/195* (2013.01); *G06F 2217/02* (2013.01); *H03F 2200/294* (2013.01); *H03F 2200/336* (2013.01); *H03F 2200/447* (2013.01); *H03F 2200/451* (2013.01); *H03F 2200/468* (2013.01); *H03M 1/1038* (2013.01); *H03M 1/1052* (2013.01); *H03M 1/12* (2013.01)

(56)                References Cited

U.S. PATENT DOCUMENTS

2014/0292403 A1   10/2014  Liu et al.
  2015/0032788 A1   1/2015   Velazquez et al.

FOREIGN PATENT DOCUMENTS

DRIFT COMPENSATION

TECHNICAL FIELD

The invention disclosed herein generally relates to serial production of electric circuits and technology for operating such circuits. In particular, it relates to methods and devices for manufacturing and operating realizations of a predefined electric circuit design in a manner to reduce the impact of environment-induced drift. It further relates to a signal processing device comprising a realization of a predefined electric circuit and a compensation stage configured to compensate drift in relation to a reference behaviour of the electric circuit design generally or to a reference behaviour of the specific realization of the electric circuit design.

BACKGROUND

In an electric circuit experiencing drift, a change in an environment condition leads to a normally undesirable change in an operational property of the circuit. Operational properties may include voltage, current, frequency, phase, amplitude, total power, power spectrum, delay, polarization and modulation characteristics. Environment conditions may include external factors, such as fluctuations in ambient temperature, internal temperature, humidity or magnetic flux density, but also internal factors such as variations in signals that are generated expressly for use by the electric circuit, e.g., signals in electric or optical form supplying the circuit with energy, input data or other information. An environment condition may be quantitatively described by a value of an environment parameter.

In a general approach illustrated in FIG. 1A, a circuit $110_m$, $120_m$ is modelled as a device producing an output signal y(t) in response to an input signal x(t) that the circuit currently receives. If the circuit is assumed to be approximately time-invariant and the input and output signals are modelled as (combinations of) periodic functions of time, the circuit can be characterized quantitatively in terms of its gain $G(\omega)$ or phase $\phi(\omega)$ at different values of the frequency $\omega$. The term frequency response is used to refer to a collection of gain or phase values, or both, for frequencies in a relevant frequency range $\omega_a \leq \omega \leq \omega_b$. In the present disclosure, the general notation $Q(\omega)$ is meant to cover both gain, phase and any combined representation of both these quantities (complex or otherwise two-dimensional, such as $Q(\omega) = G(\omega) \exp(j\phi(\omega))$ ). The operational properties of a circuit that change because of drift may include gain or phase, or both.

The precise drift behaviour of a circuit may differ quantitatively or qualitatively between different operating frequencies. The frequency dependence of an electric property's drift may be captured by measuring a series of frequency responses under different environment conditions, e.g. a collection of stable values of an observable environment parameter. An equivalent alternative may be to measure the electric property at a collection of stable operating frequencies while the environment conditions are changing in a known fashion.

Other than artificial stabilization of a circuits operating environment, it has been a commonly practised approach for reducing the negative of drift to make direct measurements and then apply a corresponding compensation. The compensation may for instance aim to approach the current output signal (or frequency response) of the circuit to a reference signal (or reference frequency response). The effective drift, i.e. with compensation applied, is thereby reduced.

The applicants earlier disclosure WO14094823A1 is cited as one example, where techniques for compensating a frequency-dependent inphase/quadrature channel mismatch are proposed. Direct measurements may be an attractive option for circuits operating under changing environment conditions, since drift-induced variations are captured as part of the measured signal, and may ultimately be compensated. The approach based on direct measurements may however be computationally costly or otherwise respond relatively slowly.

From the applicant's application WO10069365A1, it is furthermore known that a nonlinearity error in an analog-to-digital converter (ADC) can be estimated—and ultimately compensated—using a plurality of linear filters in accordance with a discrete-time model of the converter that mimics the ADC's behaviour. According to that disclosure, the discrete-time model is tuned to each individual ADC by applying test signals and measuring the corresponding output signal energy. This approach is advantageous by its relatively modest computational expense and low algorithmic delay, but could have accuracy problems unless the ADC is operated under stable environment conditions.

SUMMARY

It is an object of the present invention to propose methods and devices for manufacturing realizations of an electric circuit design that may be operated while experiencing a reduced effective drift, e.g., by proposing a technique for correcting the respective output signals of the realizations by a compensation signal. It is a further object to propose such manufacturing methods and devices with an improved throughput per unit time. It is a still further object to propose methods and devices for operating a realization of the electric circuit design with a reduced effective drift despite changing environment conditions.

At least some of these objects are achieved by the methods and devices according to the appended independent claims, which alone define the scope of protection of the present invention. The dependent claims define advantageous embodiments.

Considered are electric circuits, in particular semiconductor circuits or integrated circuits, that have been manufactured in accordance with a predefined electric circuit design. Example types of circuit designs include: analog-to-digital converter, digital-to-analog converter, upconversion mixer, downconversion mixer, frequency modulator, frequency demodulator, programmable-gain amplifier, low-noise amplifier as well as amplifiers in general. At least one input-output signal pair may be identified for the electric circuit design, wherein the input signal and output signal may be electric signals themselves, or may alternatively be received or generated optically, mechanically, acoustically or by a different physical form of energy, using suitable transducers. The electric circuits may be seen as (physical) realizations of the electric circuit design; furthermore, they may be said to belong to a main lot of realizations. The electric circuits may have been serially produced (or produced in a relatively large quantity, or produced on an industrial scale, or mass produced). A design-specific model has been defined in order to describe a frequency response of all realizations of the electric circuit design in dependence of at least one environment parameter (see previous section for examples). In particular, the design-specific model may predict distinct frequency responses, and typically does so, for distinct values of the environment parameter. While the accuracy of the design-specific model may be satisfactory in relation to some or most realizations, manufacturing defects, material defects and other irregularities may cause the accuracy to be reduced in relation to other realizations.

In one embodiment, a unit in the main lot of realizations undergoes all of the following. First, a unit-specific frequency response is recorded (or measured) at a stable value of the environment parameter(s), by performing measurements on the unit. The design-specific model, when evaluated at the stable value of the environment parameter(s), is then fitted to the unit-specific frequency response, whereby a unit-specific model is obtained, which describes a frequency response for the unit in dependence of the environment parameter(s). Finally, data representing the unit-specific model thus obtained is stored in association with the unit. This embodiment may achieve the object of manufacturing the electric circuit design so that at least one of its realizations may be operated at reduced effective drift, since the stored data may be accessed and used to predict the drift behaviour of the realization (in terms of changes in its frequency response) in a context where the realization is operated.

The data representing the unit-specific model may be stored in the realization in a local memory, which is accessible from a connected device. Alternatively, the data is stored in a memory of a compensation stage configured to be operated in association with the realization, or in a memory that such compensation stage may access during operation. Further alternatively, the data may be stored in a networked library, at a location marked with an identifier of the realization with which it is associated.

The unit-specific model may be represented and stored as a finite table of values. During operation of the unit, this table is read out by a compensation stage, which may optionally interpolate between the read values. Alternatively, the unit-specific model may be represented by a formula (analytic expression depending on frequency and the environment parameter(s)), the numeric parameters of which have been fitted to the unit after the unit has been manufactured, and which is evaluated during operation to enable compensation. The representation of the model as a formula may sometimes be more storage-efficient.

In one embodiment, the compensation stage with which the realization operates is configured to determine a present value of the environment parameter(s) and to compensate drift based thereon in relation to a reference frequency response, which is independent of the environment parameter(s). In particular, the compensation may include evaluating the unit-specific model at the determined present value of the environment parameter(s) and to determine the amount of compensation needed to reach agreement with the reference frequency response within a desired accuracy. More precisely, the compensation may include determining a current operating frequency and evaluating the frequency response (i.e., gain, phase or both) at the current operating frequency and at the determined value of the environment parameter(s). It is preferred that compensation is effected in the digital domain. As such, in the types of circuit designs mentioned above, it is preferred that the compensation stage is arranged on a side of the circuit where signals are represented in digital form.

In one embodiment, the design-specific model is prepared based on information from measurements that have been performed on realizations belonging to a test lot of realizations of the electric circuit design. As used in this disclosure, a realization belongs to the "main lot" unless it belongs to the "test lot". The main lot may be produced on one or more parallel production lines having substantially equivalent production equipment and using substantially equivalent raw materials. While relatively extensive measurements may be performed on the realizations in the test lot (e.g., recording of frequency responses for plural values of the environment parameter(s) or equivalently, recording a response at a collection of fixed frequencies for changing values of the environment parameter(s)), the main lot is produced under normal cost pressure, whereby the measuring may be reduced towards the minimal amount that is thought sufficient to guarantee that the performance of each realization lies within commercially acceptable bounds. Also for profitability reasons, it is normally to be avoided to make the test lot more numerous than justified, whereas the main lot is not restricted as to its total number; rather the main lot should comprise a large number of realizations to benefit from economies of scale. The test lot may be produced as a separate test series using the same production equipment as will be used for the main lot. Alternatively, the test lot is formed by extracting produced samples from the main lot while serial production is running; this means that the main lot need not be produced at a later point in time than the test lot. In this alternative approach, no complete design-specific model will be available when the earliest units are being produced; instead, one may revert to the earliest units later, record frequency responses at stable values of the environment parameter(s) and define unit-specific models for those units as described above.

On $M_1$ realizations in the test lot, a number N of frequency responses are recorded, each for a stable value of the environment parameter(s). One or more frequency responses are recorded for each realization. It is not necessary for all frequency responses to be recorded at identical (sets of) values of the environment parameter(s). While not essential to the present embodiment, a certain variation in the environment parameter(s) is in fact desirable, so that the design-specific model may be defined on the basis of data points that are distributed over the contemplated working range of the electric circuit design. Likewise, it is advantageous to perform measurements on more than one single realization of the electric circuit design, and preferably produced by different production lines if plural lines are provided, so that individual irregularities are 'averaged out' and neutralized. Hence, the number $M_1$ of realizations in the test lot, just like the number N of frequency responses recorded for these, are to be chosen in view of the following factors:

i) Higher cost pressure from market⇒decrease $M_1$ or N or both.
 ii) Wider required working range (environment parameter(s))⇒increase N.
 iii) Higher variation between realizations⇒increase $M_1$.

In an approach where the design-specific model is refined progressively by fitting it to more and more data points, a high variation between realizations (third factor) may translate into slow convergence of the model. It is noted that in such circumstances, the accuracy of the design-specific model is not necessarily a factor that limit the performance for a specific realization of the design; instead, an increased effort into fitting the design-specific model to individual realizations may be a more efficient measure to take.

In one embodiment, temperature may be an environment parameter, on which the design-specific model depends. To cover the working range efficiently, some frequency responses for the test lot may be recorded at ambient temperature (e.g., laboratory temperature), others while artificial cooling or heating is applied. This cooling or heating may be stabilized using feedback control, so that the frequency response is recorded at a reasonably stable temperature. A similar technique may be adopted for stabilizing other environment parameters in order for the measurements on the test lot to be of high reliability.

In one embodiment, the step of fitting the design-specific model to the frequency response recorded for a specific unit (in the main lot) may include determining a unit-specific calibration term that approximates a deviation between the design-specific model, when evaluated for said stable value of the environment parameter(s), and the unit-specific frequency response on the other. The unit-specific calibration term may be frequency-independent, or may vary with frequency. In the latter case, the unit-specific calibration term may correspond to a function of frequency being a difference between, on the one hand, the frequency response that the design-specific model predicts for the value of the environment parameter(s) and, on the other hand, the actual frequency response recorded for the specific unit in the main lot. Alternatively, if a proportional gain less than unity is applied, the unit-specific calibration term may correspond to a downscaled version of this difference.

In one embodiment, the design-specific model may comprise two mutually independent contributions: one basic frequency response (function of frequency only) and one compensation term (function of the environment parameter(s) and optionally of frequency). Since these contributions are based on collective quantities computed from measurements for the test lot, both are unit-independent. A unit-specific model, applicable for a unit in the main lot, may therefore comprise three mutually independent contributions, namely the unit-independent basic frequency response, the unit-independent compensation term and the unit-specific calibration term (function of frequency only). In mathematical formalism, letting w denote frequency, letting T and V be example environment parameters, and letting m be an index identifying the unit for which the unit-specific model is derived, the contributions on their most general form may be written: $Q_0(\omega)$, $P(\omega; T, V)$, $R_m(\omega)$. The unit-specific model may therefore be separated into three terms that are susceptible to independent evaluation: $Q_m(\omega; T, V)=Q_0(\omega)+P(\omega; T, V)+R_m(\omega)$. It is recalled that the unit-independent compensation term P and the unit-specific calibration term $R_m$ may be constant with respect to frequency. It is noted that a unit-specific model may be represented by two types of stored data, namely data having been prepared on the basis of a plurality of frequency responses measured for a test lot of realizations of the electric circuit design (first type) and data having been prepared on the basis of a measurement of a unit-specific frequency response for the unit, at a stable value of the environment parameter(s). Importantly, the data of the second type may have been prepared on the basis of a measurement of a single frequency response, or at least on the basis of a small number of measurements that would alone have been insufficient for defining a statistically reliable model of the unit's frequency response.

In one embodiment, an environment parameter, on which the design-specific model depends, may be the value of a supply voltage (or drive voltage) for powering the electric circuit design.

In one embodiment, an environment parameter, on which the design-specific model depends, may be the value of a gain of a pre-amplifier, with which the electric circuit design is configured to cooperate. Pre-amplification may be practised in connection with ADCs (or digitizers) in an I/Q modulator or I/Q demodulator.

As already noted, the reference frequency response can be assigned independently for each realization of the electric circuit design. The reference frequency response is normally a function independent of the environment parameter(s). The reference frequency response for a particular realization of the electric circuit design may be selected in accordance with a currently desired goal, such as reduction of particular realization's drift, or reduction of two realizations' relative drift, or reduction of mutual drift between the units in a group of realizations, or equalizing frequency responses of two or more realizations throughout the environment parameter(s) range. Some of these goals may only be achieved if the reference frequency response is independently assignable for each realization.

In one embodiment, a first realization of the electric circuit design is operated in conjunction with a second realization and with a compensation stage configured to compensate drift of at least the first realization. In this embodiment, the reference frequency response is a frequency response of the second realization. In this connection, the second realization is used as a reference regardless of any drift it experiences with respect to the environment parameter(s). Alternatively, the second realization is compensated (by the same or by a further compensation stage) to have reduced drift, and the reference frequency response for the first realization is chosen in such manner that it mimics the behaviour of the compensated second realization. In this connection, the reference frequency response for the second realization may be chosen to simplify the drift compensation task as far as possible, in particular, by choosing a reference frequency response that is close (in a suitable sense, such as $L^1$ or $L^2$ norm) to the actual frequency response in the greater part of the working range. This arrangement may help reduce errors deriving from a pairwise mismatch between two circuits, such as I/Q imbalance errors and errors associated with time-interleaved ADC Time-interleaved ADCs is one example application where two or more realizations of the same electric circuit design are arranged in parallel and where uncontrolled deviations between the realizations could degrade the accuracy of the ADC. Temperature and supply voltage are preferred as environment parameters in this connection.

I/Q modulators and I/Q demodulators is a further example application where two realizations of a same electric circuit design are operated in conjunction, more precisely two ADCs in parallel branches of the modulator or demodulator. In this connection, the compensation stage may be an I/Q mismatch (channel mismatch) compensator that may be configured to correct one of the respective ADC output signals (corresponding to each of the I and Q channels). Alternatively, correction is applied downstream of a data demodulator that processes the I and Q channels and combines these into a common output signal. If a preamplifier is arranged upstream of the ADCs (in particular a variable-gain amplifier, such as one preamplifier upstream of the respective ADC in each branch of the I/Q modulator or I/Q demodulator, or a common preamplifier upstream of both branches), the characteristics of the signal vary with the present gain of the preamplifier(s). The inventors have realized that the preamplification gain and/or other settings influencing the behaviour of the preamplifier(s) (collectively: gain state) is relevant as an environment parameter in the above sense. This is to say, the design-specific model may predict different frequency responses for different gain states in this embodiment.

In one embodiment, the electric circuit design relates to an ADC for converting an analog input signal into a digital output signal. The reference frequency response may for such a design be unit-independent in the sense that a plurality of realizations are compensated according to identical copies of a reference frequency response. This may achieve the double purpose of reducing drift and reducing imperfections, such as nonlinearities of the electric circuit design. The inventors have realized that an advantageous combination of environment parameters is supply voltage and temperature.

In one embodiment, the data representing the unit-specific model may express a difference between an actual frequency response and a reference frequency response. Alternatively, the data may express a ratio of the actual frequency response and the reference frequency response. The frequency response may include gain, phase, or a combination of these quantities. This is an advantageous way of representing the unit-specific model, since on average, the values to be represented will normally be close to zero (for a difference) or close to one (for a ratio). Such values can be efficiently quantized using an entropy-coding approach.

In a further aspect, a manufacturing system comprising a number of sections that cooperate to realize a predefined electric circuit of the type described above. The sections of the system may be co-located, in particular physically connected or otherwise integrated, or may alternatively be distributed geographically. In one embodiment, the manufacturing system comprises a memory storing a design-specific model of the electric circuit design, an assembly section for producing yet uncalibrated realizations of the electric circuit design, and a calibration section which is communicatively coupled to the memory. In normal operation, all realizations produced by the assembly section will be calibrated by the calibration section. The calibration section specifically comprises: an analyzer for measuring a frequency response of a produced unit, an environment sensor for determining the environment conditions under which such frequency response is measured (practically, by measuring a value of the environment parameter(s) referred to above), and a device programmer for fitting the design specific model to the measured frequency response, and thereby obtaining a unit-specific model, of which a representation is to be stored in association with the unit. The frequency response is preferably measured at an approximately stable value of the environment parameter(s).

Because only a limited amount of measurements are needed for the realizations in the main lot, the proposed manufacturing system may be implemented to have a high throughput per unit time, thereby fulfilling one of the above objects of the invention.

In one embodiment, the manufacturing system further comprises a testing section, in which a testing environment sensor, a testing analyzer and a processor cooperate to define the design-specific model on the basis of measurements on a test lot of realizations of the electric circuit design. As already described, while one of said realizations is maintained at a stable value of the environment parameter(s), a frequency response is measured for the realization. Data (frequency responses) is collected for all realizations in the test lot and preferably for different stable (sets of) values of the environment parameter(s), whereby the design-specific model can be defined. Data representing the design-specific model is stored in the memory of the manufacturing system, where it may be accessed by the calibration section.

In a further aspect, a signal processing device comprises a unit which is a realization of a predefined electric circuit design, a memory storing data representing a unit-specific model descriptive of the unit, and a compensation stage configured to compensate drift in relation to a reference frequency response, on the basis of the unit-specific model and a value of one or more environment parameters, on which the unit-specific model depends. The compensation stage may determine the value of the environment parameter(s) using an environment sensor, such as a local thermometer. Alternatively, the compensation stage obtains this information from another component of the signal processing device, such as a voltmeter arranged to determine a present value of a supply voltage.

In one embodiment, the memory of the signal processing device stores data of a least two types representing quantitative aspects of the unit-specific model. As explained above, data of the first type has been derived based on a relatively larger number of measurements (on the test lot), while data of the second type has been derived based on one or a relatively smaller number of measurements (on the unit, as part of the main lot).

In a further aspect, a unit which is a realization of a predefined electric circuit design is operated with drift compensation by referring to data representing a unit-specific model of the kind described above. More precisely, a present value of an environment parameter on which the model depends is determined, the model is evaluated for the present value, and appropriate correction is applied in order to compensate the units deviation from a reference frequency response. In particular, the compensation may include determining a current operating frequency, evaluating the model and the reference frequency response for this frequency only, and applying local compensation. When local compensation is applied, it may be sufficient to obtain only such data that represents the unit-specific model at or near the current operating frequency.

In different implementations, the data representing the unit-specific model may be stored in the unit or an associated memory, or may be retrieved from a networked library in a location designated by a unique identifier associated with the unit.

As noted above, the data representing the unit-specific model may relate to a look-up table, or an expression that can be evaluated for concrete values of variables of which the expression depends. The expression may contain elementary algebraic or transcendental functions or simple special functions, or a combination of these. In particular, the expression may be a polynomial of order less than ten, preferably less than five, such as less than four, such as a cubic or quadratic polynomial.

In a further aspect, there is provided a computer program product comprising a computer-readable medium with instructions for causing a programmable computer to execute one of the methods described above. Examples of computer-readable media are given below.

It is noted that features from the embodiments described above may be combined to form new embodiments without departing from the scope of the invention. This holds true also in cases where the features have been recited in mutually different claims, unless the features are technically incompatible.

BRIEF DESCRIPTION OF THE DRAWINGS

Embodiments will now be described in greater detail and with reference to the accompanying drawings, on which:

FIG. 1A shows an electric circuit design;

All figures are schematic and generally show only parts that are necessary for the purpose of elucidating the invention, whereas other parts may be omitted or merely suggested.

DETAILED DESCRIPTION OF EMBODIMENTS

Figure 1B:
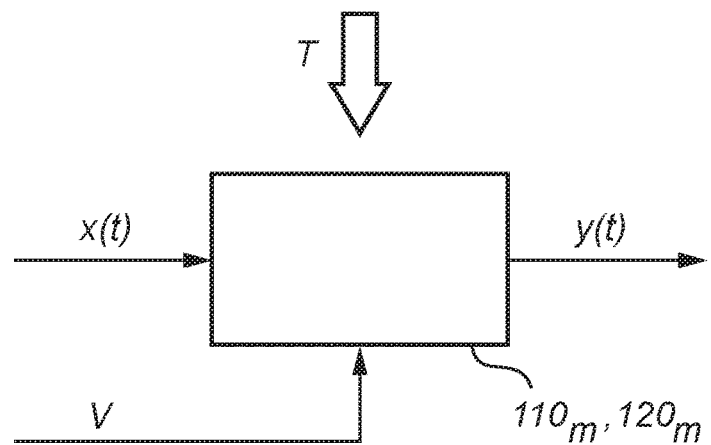
FIG. 1B shows an electric circuit design and a corresponding compensation stage, according to one embodiment.
Figure 1B:
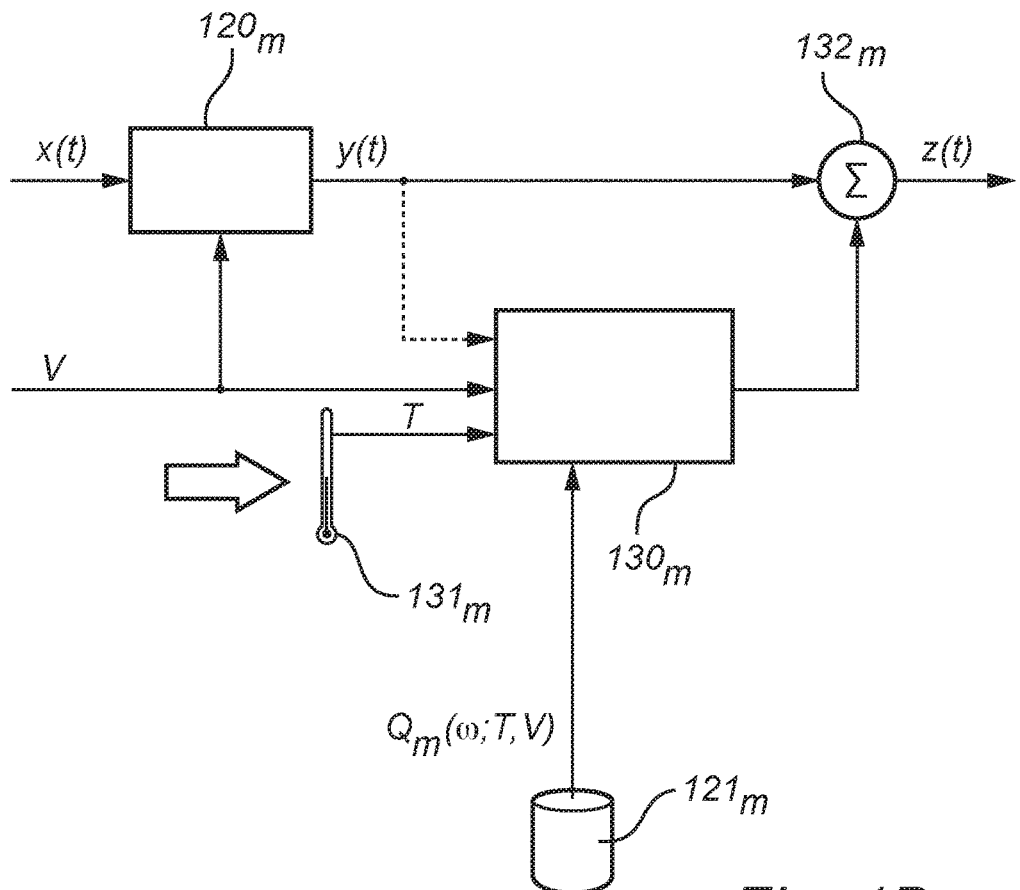

FIG. 1A has been briefly discussed above. FIG. 1B shows an identical unit $120_m$, which is a realization (in the main lot) of a predefined electric circuit design that is operated in conjunction with a compensation stage $130_m$. The compensation stage $130_m$ may serve the unit $120_m$ or additional units as well. For the purposes of compensating drift in the unit $120_m$, however, the compensation stage $130_m$ retrieves data representing a unit-specific model $Q_m(\omega; T, V)$ from a memory $121_m$. The unit-specific model predicts a frequency response (including gain, phase or a combination of these quantities) for each value in the allowed range of the operating frequency ω and two environment parameters T and V. The allowed range may for instance be a neighborhood of a triple of nominal values $(\omega_0, T_0, V_0)$. In the example, the unit-specific model takes into account the effect of one internal and one external quantity, wherein the internal quantity is being read out directly from an electric line, and the external quantity is measured using a sensor $131_m$. In variations to this embodiment, the unit-specific model may consider only external or only internal factors, or a combination of any number of each. In the example, the unit-specific model depends of a supply voltage of V [volt], with which the unit $120_m$ is driven, and a temperature of T [Kelvin]. Here, the voltage can be read out directly from a line parallel to the supply voltage line into the unit $120_m$, whereas a dedicated temperature sensor $131_m$ is arranged in proximity of the unit $120_m$ and communicatively connected to the compensation stage $130_m$.

The compensation stage $130_m$ may optionally receive the output signal y(t) of the unit $120_m$, based on which it may determine a current operating frequency ω. It is emphasized that the compensation stage $130_m$ need not use the y(t) to determine the current drift of the device; this is instead predicted by the unit-specific model. Alternatively, the compensation stage $130_m$ receives the input signal x(t) and determines the current operating frequency ω based on that signal. As yet another alternative, the compensation stage $130_m$ applies frequency-independent compensation, wherein there is no need to determine the current operating frequency ω; in this situation the unit-specific model may be frequency-independent, or may change to such little extent due to frequency, that compensation with reasonable accuracy can be achieved without specific regard to frequency.

By evaluating the unit-specific model for current values of the environment parameters (and optionally, for a current operating frequency), the compensation stage $130_m$ determines an actual frequency response of the unit $120_m$. Based on the actual frequency response and on a predetermined reference frequency response, the compensation stage $130_m$ outputs a compensation signal, which a summer $132_m$ adds to the output signal y(t) of the unit $120_m$, whereby a compensated output signal z(t) is obtained. In normal operation of the compensation stage $130_m$, the drift with respect of the environment parameters of the compensated output signal z(t) (effective drift) is reduced compared to that of the output signal y(t).

As noted previously, the compensation stage $130_m$ may alternatively access the unit-specific model expressed in terms of an actual deviation from the reference frequency response. One may then typically use a constant multiple of the deviation as the compensation signal to be added to the output signal y(t). This approach may be computationally advantageous and, as explained, advantageous from the point of view of memory usage (efficient quantization/coding; no need to store reference frequency response) as well. If it is expected that the reference frequency response will be substituted over the lifetime of the unit $120_m$, however, it may be preferable to store the reference frequency response separately from the unit-specific model.

In an alternative but functionally equivalent implementation, the summer 132 may be replaced by a multiplier (not shown) which acts multiplicatively upon the output signal y(t) in that this signal is rescaled by a factor given by the compensation signal. In this implementation, it may be convenient to represent the unit-specific model as a ratio of a reference frequency response and an actual frequency response of the unit.

Figure 2:
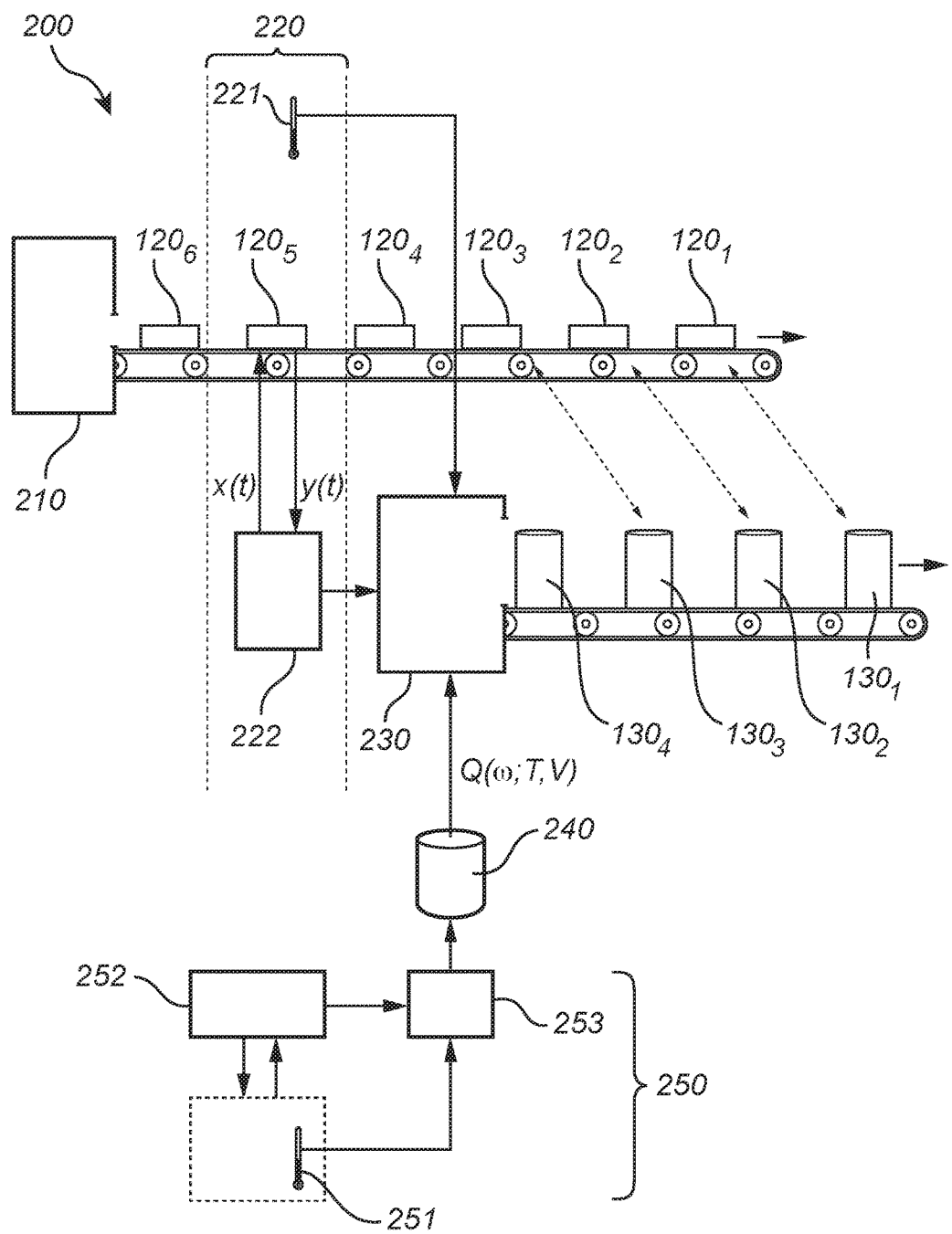
FIG. 2 shows a manufacturing system for realizing an electric circuit design, according to one embodiment.

FIG. 2 shows a manufacturing system 200, which for simplicity has been drawn as a co-located assembly and in a schematic fashion. It is recalled that the sections of the manufacturing system may well be geographically distributed and/or may be operated in a non-contemporaneous fashion.

In the system, an assembly section 210 produces units $120_1, 120_2, \ldots$ which are realizations of a predetermined electric circuit design. The electric circuit design may be encoded in a memory as a hardware description, a circuit layout or the like, and may optionally be supplemented by instructions concerning raw materials to be used. The units $120_1, 120_2, \ldots$ leave the assembly section in an uncalibrated condition, and drift compensation of the units while still in this condition is only possible on the basis of direct measurements. The system 200 further comprises a calibration section 220, a device programmer 230, a memory 240 storing a design-specific model and an optional testing section 250.

In the calibration section 220, an environment sensor 221 measures a value of one or more environment parameters, on which the design-specific model depends. For purposes of illustration, the environment parameters have been denoted by T and V on the drawing, and the environment sensor 221 has been exemplified by a thermometer symbol; it is recalled that the invention is by no means limited to models dependent on two environment parameters nor environment parameters from which one is temperature. The calibration section 220 may further comprise means (not shown) for actively bringing about desired environment conditions, such as a power source for applying a selected supply voltage. When the measured or applied environment conditions are stable within an applicable accuracy, the analyzer 222 applies a test input signal x(t) to the unit currently present (on the drawing: unit 120$_5$) and records an output signal y(t) in order to produce a frequency response in a relevant frequency interval [$\omega_a, \omega_b$]. Data representing the frequency response thus produced are then supplied from the analyzer 222 to the device programmer 230.

The device programmer 230 is configured to retrieve the design-specific model (or relevant portions thereof) from the memory 240 and fit the design-specific model to the frequency response of the unit 120$_5$ under consideration, so that a unit-specific model is obtained. The device programmer 230 is further configured to store data representing the unit-specific model of a given unit 120$_m$ in a memory 130$_m$ associated with the unit. As noted above, the memory 130$_m$ may be internal or external to the unit 120$_m$, or may be part of a networked library, from which it may be accessed by one or more compensation stages (not shown in FIG. 2).

In the optional testing section 250 of the manufacturing system 200, there is provided a testing environment sensor 251 arranged in proximity of a testing analyzer 252 together with optional means (not shown) for actively applying a relevant environment condition to a unit under testing. The measurement results, including frequency responses in a relevant interval, are analyzed by a processor 253, which defines the design-specific model based on the results and forwards data representing the model for storage in the memory 240. Under normal cost pressure, it is contemplated that measurements in the testing section 250 are only to be performed on units belonging to a test lot of realizations of the electric circuit design. Units in the main lot are only to be measured in the calibration section 220.

Figure 3:
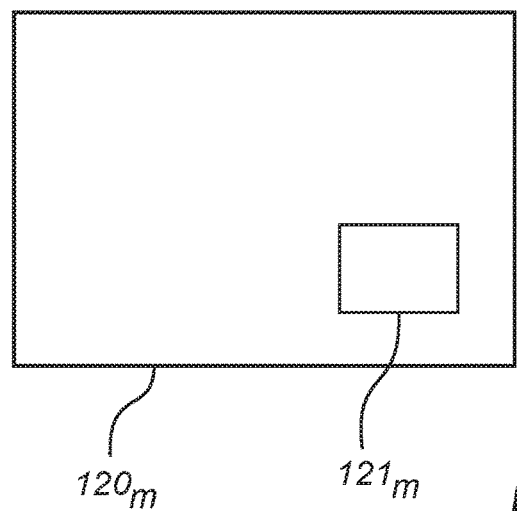
FIG. 3 shows an electric circuit design with an integrated memory for storing a unit-specific model, according to one embodiment.

As to products of the manufacturing system 200, FIG. 3 shows a serially produced unit 120$_m$ with an integrated memory 121$_m$ for storing data representing a unit-specific model. The integrated memory 121$_m$, which is preferably of a non-volatile type that does not require sustained powering to maintain stored data, has been made accessible from a compensation stage (not shown) which can be arranged in conjunction with the unit 120$_m$ and is responsible for compensating drift. For instance, a wireless or wired connection may be established between the integrated memory 121$_m$ and the compensation stage.

Figure 4:
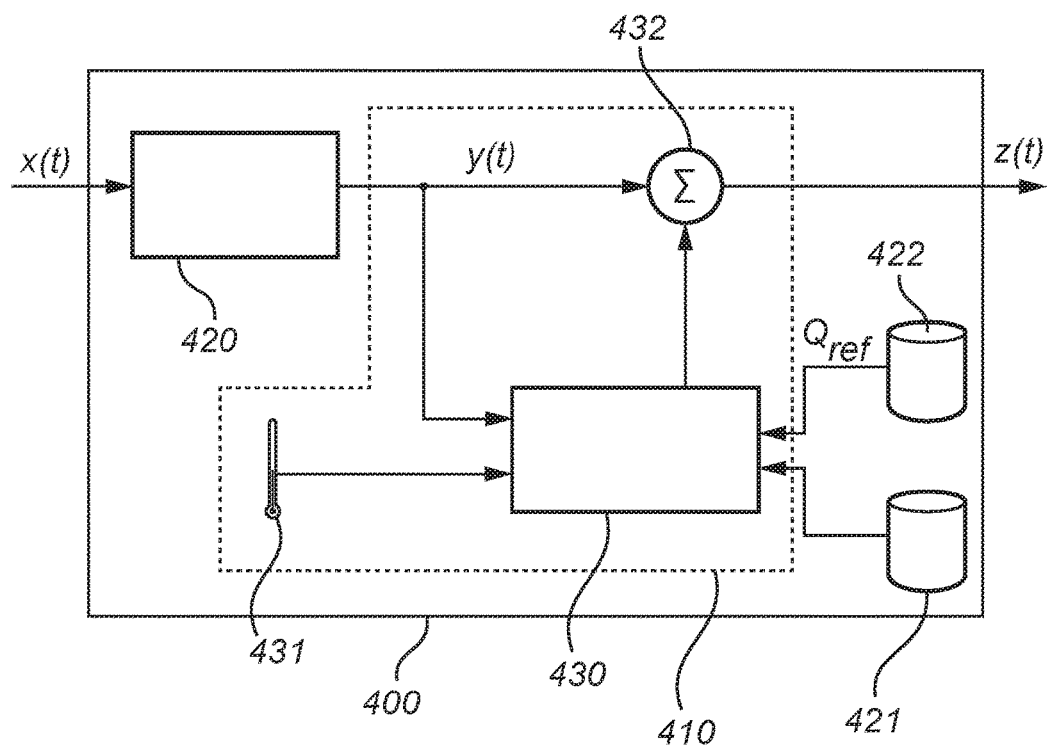
FIG. 4 shows a signal processing device with an integrated compensation stage and memory for storing a unit-specific model, according to one embodiment.

As an alternative to the above approach of arranging an integrated memory containing the unit-specific model, FIG. 4 shows a serially produced signal processing device 400 arranged to receive an input signal x(t) and to supply, as its final output, a compensated output signal z(t) that is produced by a summer 432 as a sum of, on the one hand, a raw output signal y(t) from a unit 420, which is a realization of an electric circuit design, and on the other hand, a compensation signal prepared by a compensation processor 430. The compensation processor 430 may be configured to derive the compensation signal on the basis of the unit-specific model retrieved from a first memory 421 and evaluated for a current operating frequency and a present value of an environment parameter, and further on the basis of a reference frequency response $Q_{ref}$ of the unit, retrieved from a second memory 422, with which the compensation processor 430 compares the predicted frequency response. In the example illustrated in FIG. 4, the current operating frequency is derived from the raw output signal y(t). For an approximately time-invariant electric circuit design, an equivalent result will be obtained if the operating frequency is derived from the input signal x(t). The present value of the environment parameter, on which the unit-specific model depends, is measured by a sensor 431 arranged in proximity of the unit 420.

As has been indicated by a dashed frame on the drawing, the sensor 431, summer 432 and compensation processor 430 may be regarded as a compensation stage 410 being a cooperating assembly comprising these devices. Such compensation stage 410 receives the raw output signal y(t) and produces the compensated output signal z(t). The sensor is included in the compensation stage 410 as an integral part. The compensation stage 410 may be said to process the raw input signal y(t) into a less drift-affected signal, rather than adding a compensation term that cancels (part of) the drift-induced deviation from the reference frequency response.

An industrially useful application of the circuits shown in FIGS. 3 and 4 is ADCs. Cancellation of drift as such is the primary purpose of the compensation arrangements shown or enabled in these circuits. The inventors however envision that a compensation processor or compensation stage of the type exemplified in FIG. 4 can be given further responsibilities, such as the cancellation or reduction of nonlinearity errors.

Figure 5:
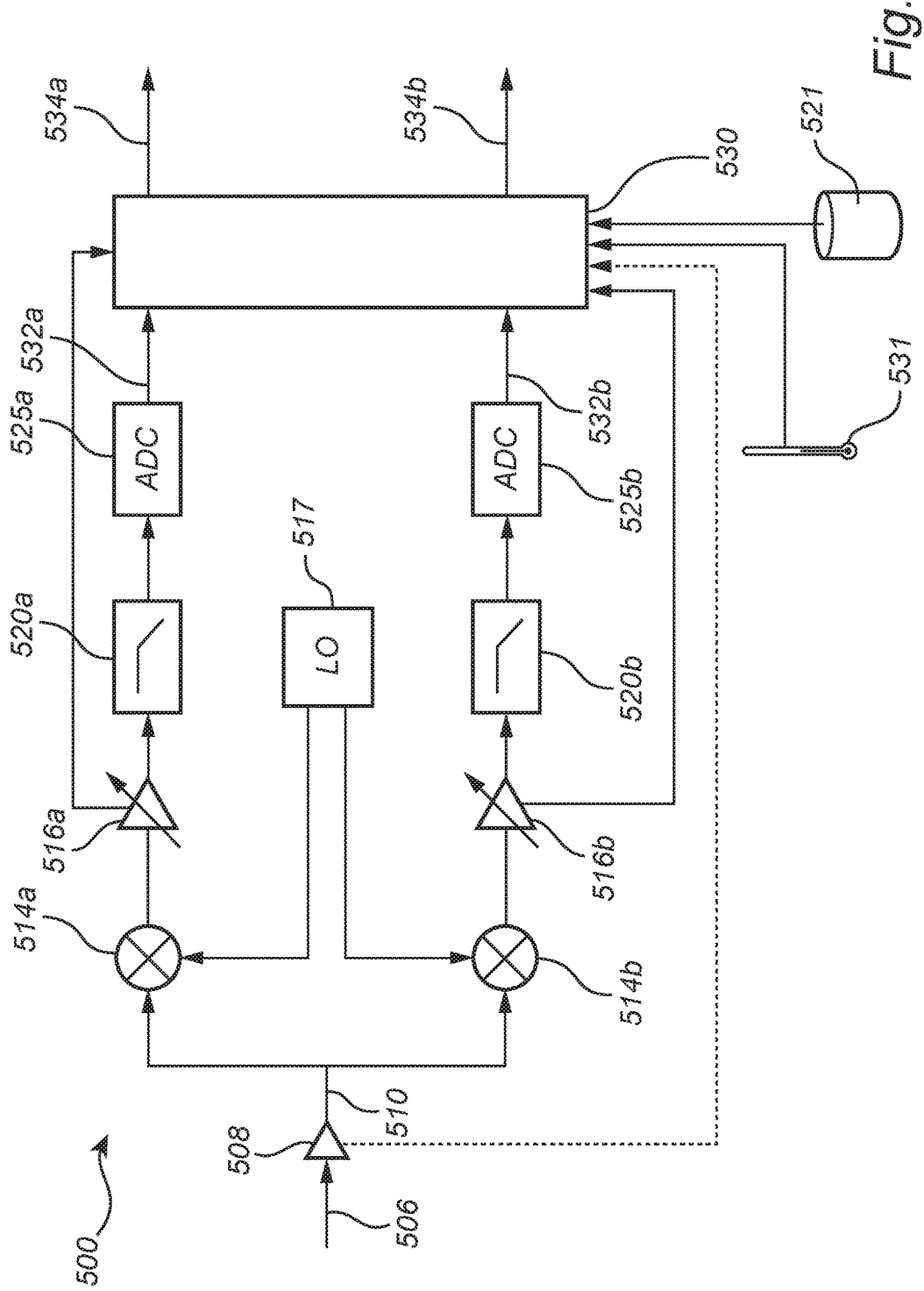
FIG. 5 shows a detail of a I/Q demodulator with a compensation stage according to one embodiment.

Turning now to presently contemplated applications where a realization of an electric circuit design is operated in conjunction with further realizations, FIG. 5 shows a detail of an in-phase/quadrature demodulator 500. Such a device has been described in greater detail in the applicants earlier disclosure WO10105694A1. The I/Q demodulator 500, which may be arranged in a quadrature receiver, comprises an upper branch acting as in-phase (I) signal path and a lower path acting as quadrature (Q) signal path. The I signal path comprises a first mixer 514a, and the Q signal path comprises a second mixer 514b. Both mixers 514a and 514b are adapted to process a preamplified radio-frequency (RF) signal on an input port 510. The preamplified RF signal is produced on the basis of a received RF signal supplied at point 506, to which a suitable gain is applied. The gain may be applied either by a common pre-amplifier 508 or by preamplifiers 516a and 516b (shown as variable-gain amplifiers) arranged downstream of the respective mixers 514a and 514b in each branch of the I/Q demodulator. Preferably, the gain is signal-adaptive and may change so as to respond to variations in the received RF signal, in particular variations due to changing reception conditions to achieve a desired swing of the signal at the input port 510.

Furthermore, the I/Q demodulator 500 comprises a local oscillator (LO) unit 517, which is adapted to generate LO signals to the mixers 514a and 514b. The LO signals supplied to the mixers 514a and 514b are provided in quadrature, i.e., ideally, there is a 90-degree mutual phase shift between the LO signals. The mixers 514a and 514b are arranged to perform frequency down-conversion of a signal frequency band of interest of the RF signal to a lower frequency range. According to the embodiment illustrated in FIG. 5, the I/Q demodulator 500 further comprises a first filter 520a and a second filter 520b in the I and Q signal paths respectively, shown downstream of the variable-gain preamplifiers 516a and 516b in FIG. 5. The filters 520a and 520b are arranged to suppress undesired frequency components output from the mixers 514a and 514b and possibly amplified by preamplifiers 516a and 516b. In FIG. 5, the filters 520a and 520b are illustrated as low-pass filters. However, in other embodiments, where the I/Q demodulator may be of a different type (e.g., not necessarily adapted for use in a direct conversion receiver), the filters 520a and 520b may instead be band-pass filters. Moreover, in the embodiment illustrated in FIG. 5, the I/Q demodulator 500 comprises a first ADC 525a and a second ADC 525b in the I and Q signal paths, respectively. The first ADC 525a is adapted to convert the output signal from the filter 520a into a digital representation for generating a real-valued uncompensated digital I component. Similarly, the second ADC 525b is adapted to convert the output signal from the filter 520b into a digital representation for generating a real-valued uncompensated digital Q component. These real-valued signals may together be regarded as an uncompensated complex digital signal.

As explained in WO10105694A1, poor channel balancing, i.e., a condition where the transfer functions of the I and Q signal paths are not approximately equal, limits the achievable image attenuation, which is otherwise a desirable property of an I/Q demodulator. Such imbalance is normally due to temperature variations, manufacturing inaccuracies, and other non-idealities of the physical components in the I and Q signal paths.

To compensate the problems with insufficient image attenuation, the I/Q demodulator 500 further comprises a compensation stage 530, which is adapted to compensate imbalance between the I and Q signal paths. The compensation stage 530 is adapted to receive the uncompensated digital signal from a point 532a, 532 downstream of the ADCs 525a, 525b and to reduce said imbalance. In alternative embodiments, one or more intervening components (not shown) for generating signals based on the output signals from the ADCs 525a and 525b may be connected immediately downstream of these components. Nonlimiting examples of such intervening components may e.g. be filters or components for performing sample-rate conversion, such as interpolation or decimation.

In an example implementation of the setup shown in FIG. 5, the compensation stage 530 compensates outputs of both the first ADC 525a and the second ADC 525b, on the basis of unit-specific models, which are retrieved from memory 521 and take into account at least a present gain state (or gain setting). The present gain state may be a setting of the common preamplifier 508 (illustrated in FIG. 5 by a dashed connection line) or of each of the preamplifiers 516a, 516b arranged in each branch or both of these. (For illustration purposes, it has been suggested in FIG. 5 that the unit-specific models also include the influence of an external environment parameter, which is measured using a sensor 531.) The first ADC 525a is compensated towards a reference frequency response $Q_{ref,1} = Q_{ref,1}(\omega)$ that is independent of the gain state but may otherwise be close to the uncompensated frequency response (in the working range) of the first ADC 525a. The second ADC 525b is compensated towards an identical or approximately identical frequency response as the first ADC 525a, that is, $Q_{ref,2} = Q_{ref,1}$. Configured this way, the compensation stage 530 helps ensure that the I/Q demodulator stays balanced throughout the working range, in particular for different gain states of the pre-amplifier 508 and/or the preamplifiers 516a, 516b.

In a further example implementation, the compensation stage 530 is replaced by two channel-wise compensation stages arranged in the respective branches and operating independently. With regard to the language of the appended claims, the combination of two channel-wise compensation stages functionally constitutes an I/Q mismatch compensator. The two channel-wise compensation stages may have been programmed to apply identical reference frequency responses, so that both channels are compensated towards a common reference point and channel mismatch is reduced or limited. This may lead to a relatively simpler implementation but may in general be associated with more bandwidth-limited performance than the option shown in FIG. 5.

It is believed to be within the abilities of those skilled on the art to adapt, using common general knowledge and/or routine experimentation, the compensation stage described above with reference to FIG. 5 for use in an I/Q modulator.

Figure 8:
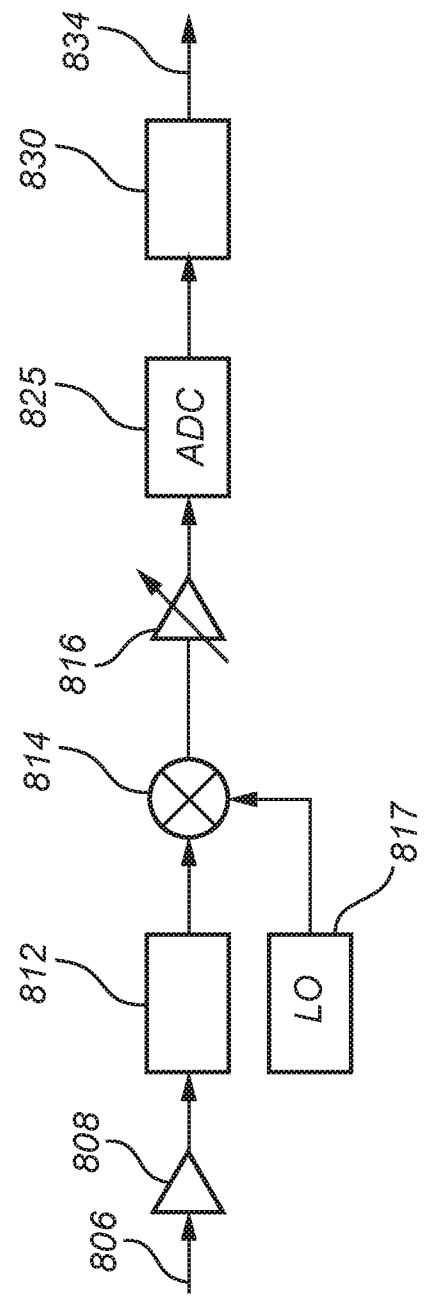
FIG. 8 shows a detail of a frequency demodulator with a compensation stage according to one embodiment.

In FIG. 8, there is illustrated a demodulator. The demodulator differs from the I/Q modulator according to FIG. 5 in that it operates on a single channel or on multiple channels to which a common LO signal is applied. Put differently, the demodulator illustrated in FIG. 8 provides a real-valued scalar or real-valued vector as output. The demodulator may be arranged in an RF receiver or may be associated with an RF receiver.

The demodulator comprises components adapted to process an input signal, preferably an RF signal, supplied to the demodulator at point 806 and to provide a digital signal at point 834 as outcome of the processing. As shown in FIG. 8, the demodulator comprises a first preamplifier 808, a filter 812, a mixer 814, a local oscillator (LO) 817 connected to the mixer 814, a second preamplifier 816, an ADC 825 and a compensation stage 830 at the far downstream end. The components function analogously to their counterparts in FIG. 5. In particular, the filter 812 may be a low-pass filter. With this setup, the signal reaching the input side of the ADC 825 has undergone at least one of the operations mixing, filtration, amplification in the first preamplifier 808 and amplification in the second preamplifier 816. In an embodiment, at least one of the preamplifiers has variable gain and its gain state (or gain setting) is fed to the compensation stage 830 as an environment parameter. As such, the action of the compensation stage 830 at a given point in time may be influenced by the current gain state of the first preamplifier 808 or the current gain state of the second preamplifier 816 or both. More precisely, the compensation stage 830 compensates drift with respect to a (predefined) reference frequency response by predicting the actual behaviour of the ADC 825 in accordance with the unit-specific model evaluated at this value of the current gain state.

Figure 6:
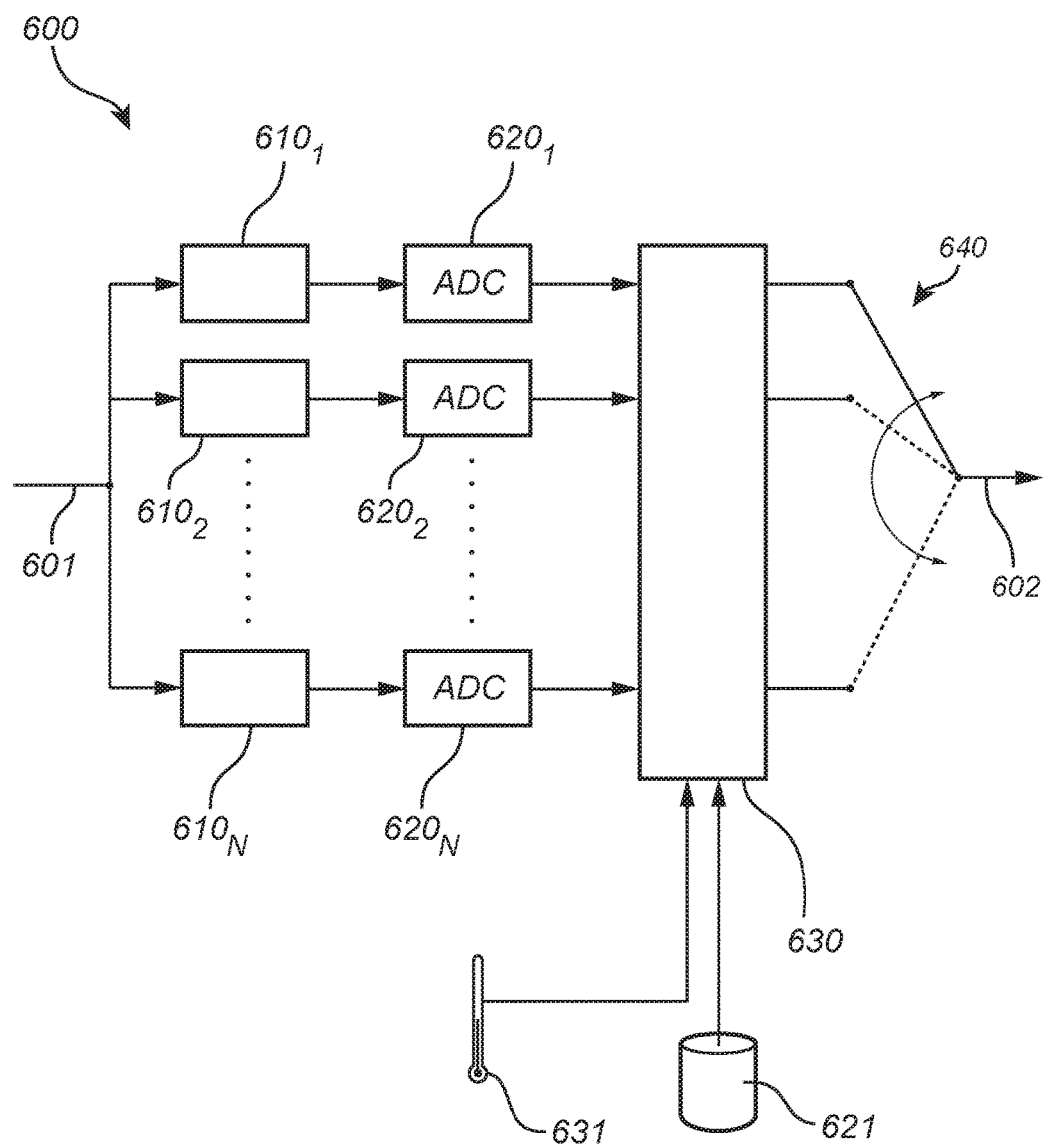
FIG. 6 shows a time-interleaved ADC with N≥2 parallel subconverters and a compensation stage according to one embodiment.

FIG. 6 shows a time-interleaved ADC 600, comprising a number $N \geq 2$ of parallel subconverters $620_1, 620_2, \ldots$, each being arranged in a signal path extending from an input port 601 to an output port 602 of the time-interleaved ADC 600. The respective, potentially diverging channel frequency responses along the signal path from the input port 601 up to each subconverter $620_m$ has been schematically indicated by a respective transfer function $610_m$. Downstream of the N subconverters $620_1, 620_2, \ldots$, there is arranged a common compensating stage 630, receiving N inputs and generating N outputs. Downstream of the compensating stage 630, a selector 640 is arranged, which has been schematically drawn as a switch, configured to connect one at a time of the N outputs of the compensating stage 630 to the output port 602 of the time-interleaved ADC 600.

The compensating stage 630 retrieves data representing unit-specific models of the subconverters $620_1, 620_2, \ldots$ and further includes a sensor 631 for sensing a present value of one or more environment parameters on which the unit-specific models depend. The sensor 631 may comprise subsensors associated with each of the subconverters $620_1$, $620_2$, . . . , so that a local value of the environment parameter(s) can be measured with high accuracy. The compensating stage 630 is capable of compensating drift in the output signal of each of the subconverters $620_1$, $620_2$, . . . , so that the output signal approaches a reference frequency response $Q_{ref,m}$ that has been set for a corresponding subconverter $620_m$. The designer of the time-interleaved ADC 600 is free to select reference frequency responses that further equalize the subconverters $620_1$, $620_2$, . . . to one another, and throughout a relevant frequency range; this is discussed below with reference to FIG. 7. The compensation stage 630 may further be responsible for compensating undesired divergences among the channel frequency responses; this problem has been discussed previously in the applicants application EP2158680A1.

In a variation of the structure shown in FIG. 6, the compensation stage 630 may be located downstream of the selector 640.

Figure 7A:
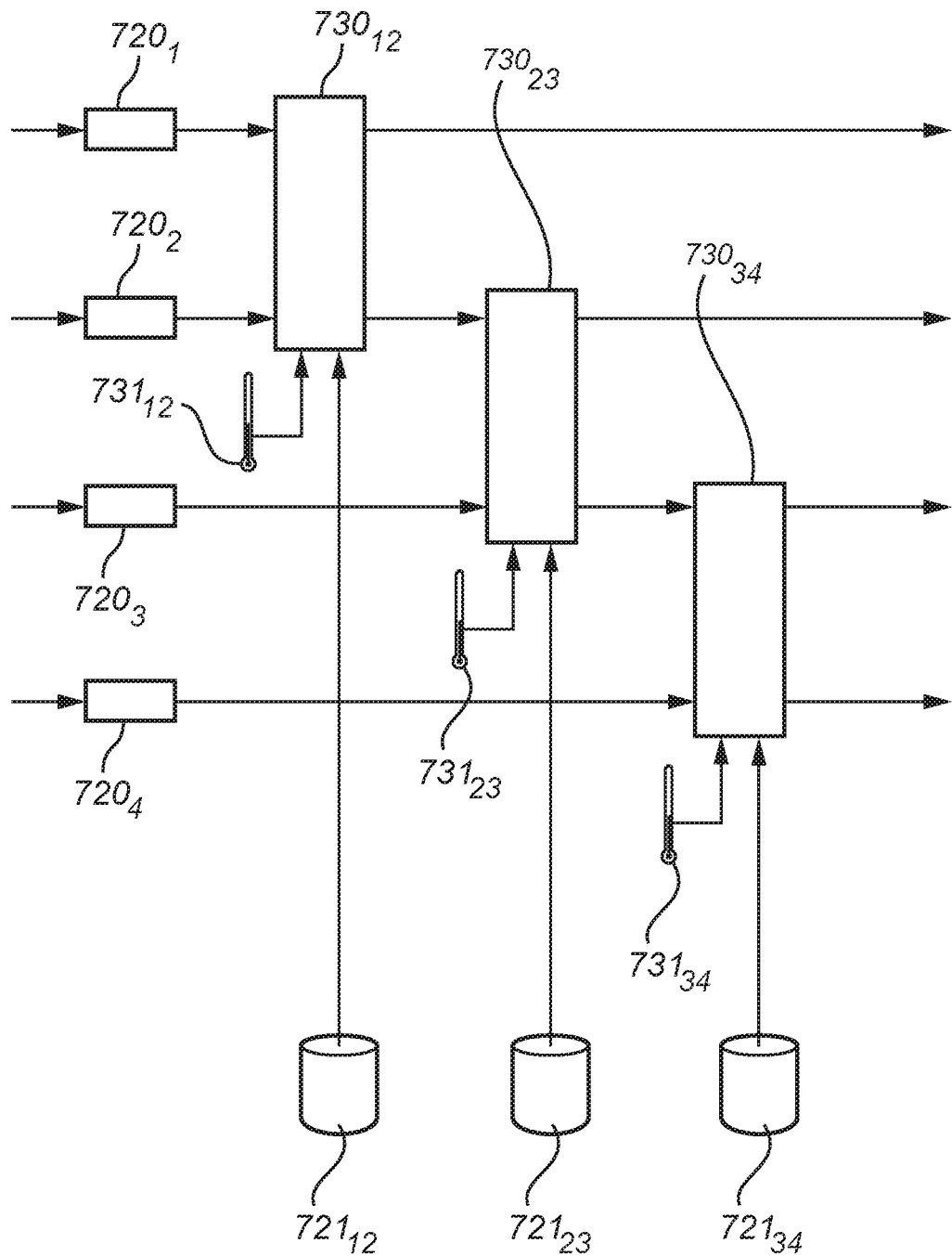
FIGS. 7A, 7B, 7C and 7D show details of time-interleaved ADCs each having four parallel subconverters and at least one compensation stage according to one embodiment.

FIG. 7A shows a detail of a time-interleaved ADC with four parallel subconverters $720_1$, $720_2$, $720_3$, $720_4$. In addition to compensating drift in each of the subconverters $720_1$, $720_2$, $720_3$, $720_4$, it is desired to limit the mutual drift among the subconverters $720_1$, $720_2$, $720_3$, $720_4$. For this purpose, three compensation stages $730_{12}$, $730_{23}$, $730_{34}$ are included. Each of these is connected to a respective environment sensor $731_{21}$, $731_{23}$, $731_{34}$ and to a memory $721_{21}$, $721_{23}$, $721_{34}$ storing data that represents unit-specific models of the subconverters $720_1$, $720_2$, $720_3$, $720_4$. Downstream of the compensators $730_{12}$, $730_{23}$, $730_{34}$, there may be provided a selector similar to the selector 640 shown in FIG. 6.

Figure 7B:
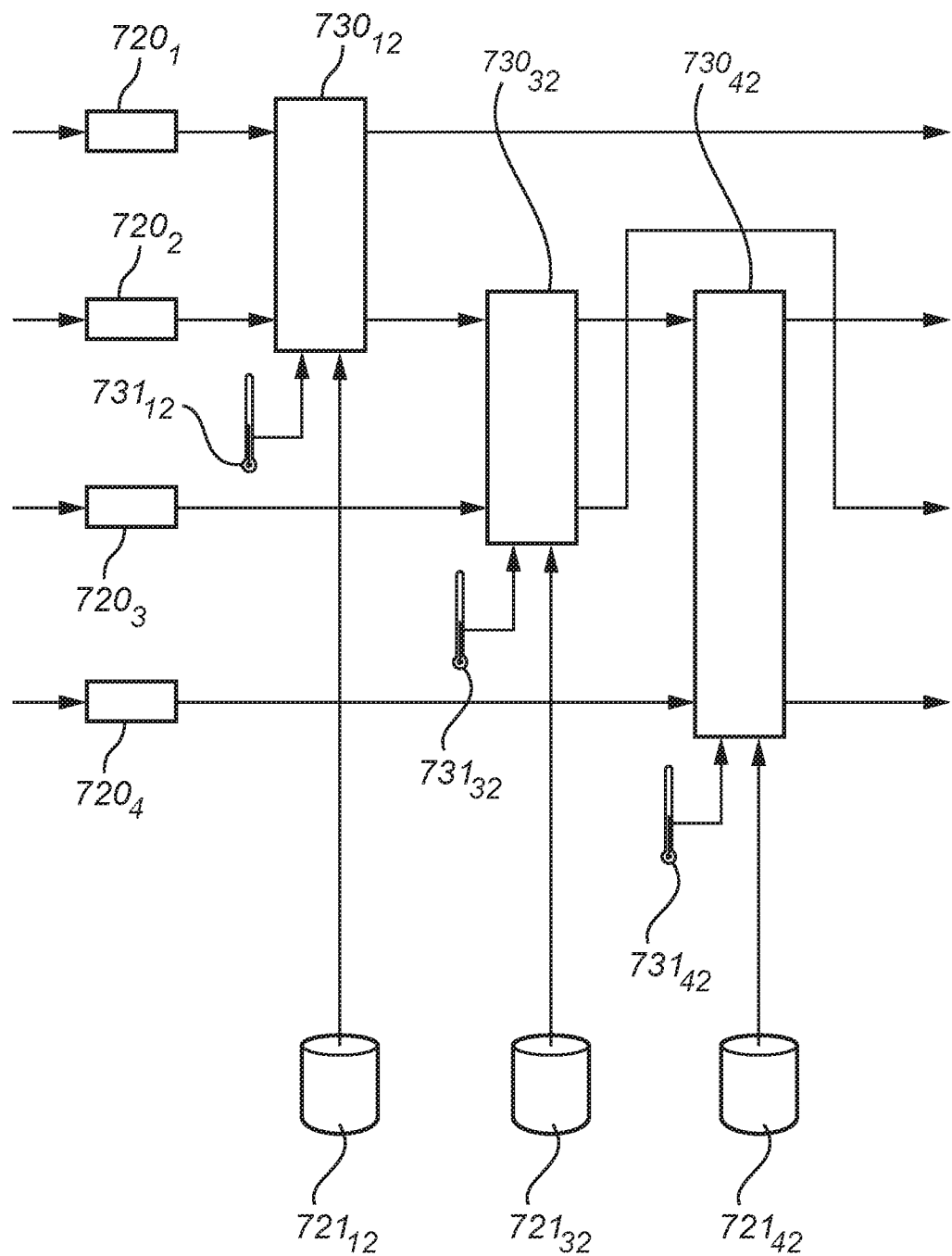

FIG. 7B illustrates a functionally equivalent alternative to the layout according to FIG. 7A. Three compensation stages $730_{12}$, $730_{32}$, $730_{42}$ are included, but unlike the cascade-like layout of FIG. 7A, all three use the frequency response of the second subconverter $720_2$ as a reference frequency response. This difference, which implies that the output of the second subconverter 720 is passed through three successive compensation stages, may translate into a reduction in error propagation among the four compensated signals.

Figure 7D:
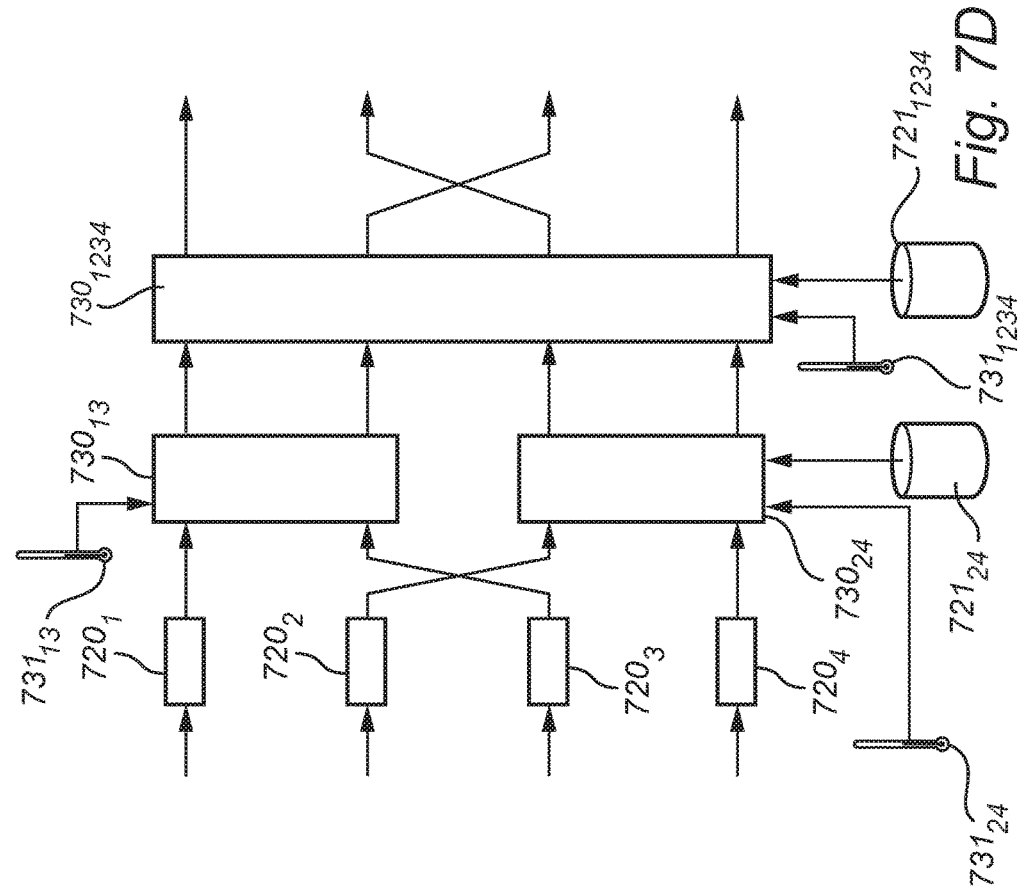
Figure 7C:
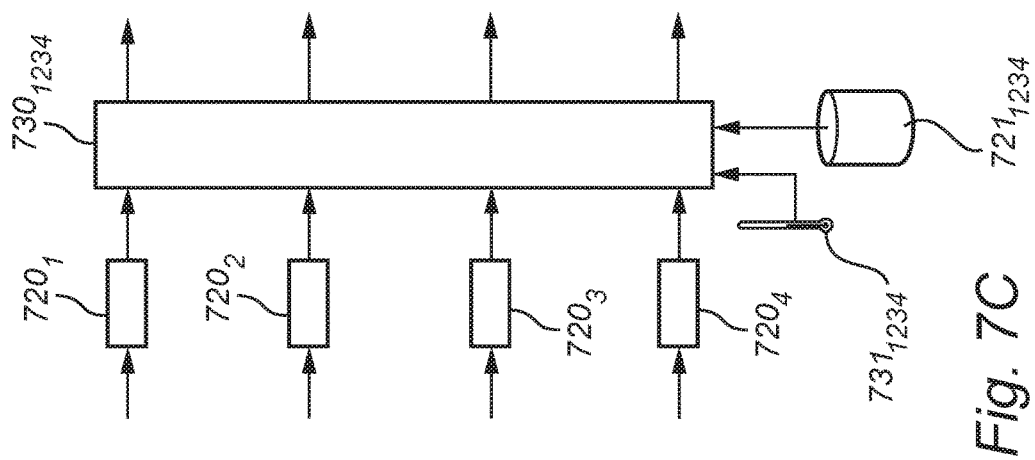

FIG. 7C illustrates a functionally equivalent alternative to the layout according to FIG. 7A. Here, a single compensation stage $730_{1234}$ is common to all four subconverters $720_1$, $720_2$, $720_3$, $720_4$. Because the single compensation stage $730_{1234}$ has contemporaneous access to signals from all four subconverters, superior performance can be expected. This also makes it possible to carry out sophisticated, possibly signal-adaptive, joint compensation schemes.

Finally, FIG. 7D illustrates a hybrid approach, in which a first pre-compensation stage $730_{13}$ is responsible for reducing mutual drift between the output signals of the first $720_1$ and third $720_3$ subconverters, and a second pre-compensation stage $730_{24}$ is responsible for reducing mutual drift between the output signals of the second $720_2$ and fourth $720_4$ subconverters. Downstream of the pre-compensation stages, a common compensation stage $730_{1234}$ applies final compensation to further reduce mutual drift within each mentioned pair of signals and, additionally, between the two pairs. Due to a stabilizing action that may be expected from the pre-compensation stages $730_{13}$ and $730_{24}$, the common compensation stage $730_{1234}$ has a more manageable compensation task to fulfil and is likely to be successful in this under a wider range of operating conditions.

CLOSING REMARKS

Even though the present disclosure describes and depicts specific example embodiments, the invention is not restricted to these specific examples. Modifications and variations to the above example embodiments can be made without departing from the scope of the invention, which is defined by the accompanying claims only.

In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs appearing in the claims are not to be understood as limiting their scope.

The devices and methods disclosed above may be implemented as software, firmware, hardware or a combination thereof. In a hardware implementation, the division of tasks between functional units referred to in the above description does not necessarily correspond to the division into physical units; to the contrary, one physical component may have multiple functionalities, and one task may be carried out in a distributed fashion, by several physical components in cooperation. Certain components or all components may be implemented as software executed by a digital processor, signal processor or microprocessor, or be implemented as hardware or as an application-specific integrated circuit. Such software may be distributed on computer readable media, which may comprise computer storage media (or nontransitory media) and communication media (or transitory media). As is well known to a person skilled in the art, the term computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Further, it is well known to the skilled person that communication media typically embodies computer readable instructions, data structures, program modules or other data in a modulated data signal such as a carrier wave or other transport mechanism and includes any information delivery media.

The invention claimed is:

1. A method associated with an electric circuit manufactured in accordance with a predefined electric circuit design and defining a frequency response between an input signal and an output signal in a frequency range, the method comprising:

ii) defining, based on measurements on a test lot of other electric circuits also manufactured in accordance with the electric circuit design, a design-specific model for the electric circuit design, the design-specific model describing a frequency response of the electric circuit design in dependence of at least one parameter affecting operation of the electric circuit design; and for the electric circuit:

iii-1) obtaining a unit-specific frequency response as a frequency response for the electric circuit measured at a certain value of the at least one parameter;

iii-2) fitting the design-specific model at said certain value of the at least one parameter to said unit-specific frequency response, whereby a unit-specific model for the electric circuit is obtained describing a frequency response for the electric circuit in dependence of the at least one parameter; and iii-3) storing, in association with the electric circuit, data representing the unit-specific model such that the electric circuit is operable in conjunction with a compensation stage, which is configured to retrieve said data representing the unit-specific model, determine a present value of the at least one parameter and, based on said present value and said unit-specific model, compensate a deviation between a frequency response of said electric circuit and a reference frequency response, wherein the reference frequency response is independent of the at least one parameter.

2. The method of claim 1, further comprising a preceding step of:
i) measuring N frequency responses for a test lot of other electric circuits manufactured in accordance with the electric circuit design, wherein each frequency response is measured at a certain value of the at least one parameter and the certain values of the at least one parameter are distributed over a parameter range.

3. The method of claim 1, wherein temperature is one of the at least one parameters.

4. The method of claim 1, wherein:
the electric circuit is configured to be powered by a supply voltage; and
a voltage of the supply voltage is one of the at least one parameters.

5. The method of claim 1, wherein:
the electric circuit is configured for use with a preamplifier; and
a gain of said pre-amplifier is one of the at least one parameters.

6. The method of claim 1, wherein step iii-2 includes determining a unit-specific calibration term approximating a deviation between, on the one hand, the design-specific model at said certain value of the at least one parameter and, on the other hand, the unit-specific frequency response.

7. The method of claim 6, wherein the unit-specific model is a sum of three independent contributions:
a unit-independent frequency response;
a unit-independent compensation term, which varies with the at least one parameter; and
the unit-specific calibration term.

8. The method of claim 1, further comprising operating the electric circuit in conjunction with a further electric circuit also manufactured in accordance with the electric circuit design, wherein the reference frequency response is a frequency response of said further electric circuit.

9. The method of claim 8, wherein:
the electric circuit is an analog-to-digital converter; and
the operating the electric circuit and the further electric circuit includes operating as parallel components of a time-interleaved analog-to-digital conversion system.

10. The method of claim 9, wherein temperature and supply voltage for powering the electric circuit are the at least one parameter.

11. The method of claim 8, wherein:
the electric circuit is an analog-to-digital converter;
the operating the electric circuit and the further electric circuit includes operating when arranged in parallel branches of an in-phase/quadrature, modulator or I/Q demodulator; and
the compensation stage is an I/Q mismatch compensator.

12. The method of claim 11, wherein:
a preamplifier is arranged in each branch upstream of a respective one of said electric circuit and said further electric circuit; and temperature and a gain state of the preamplifiers are the at least one parameter.

13. The method of claim 1, wherein:
the electric circuit is an analog-to-digital converter, the input signal being an analog signal and the output signal being a digital electric signal;
the reference frequency response is unit-independent;
the analog-to-digital converter is configured to be powered by a supply voltage; and
the at least one parameters are a voltage of the supply voltage and temperature.

14. The method of claim 2, wherein the data stored in step iii-3 represents the unit-specific model in terms of a difference or a ratio with respect to said reference frequency response.

15. The method of claim 1, wherein the electric circuit is a semiconductor circuit, preferably an integrated circuit.

16. A signal processing device comprising:
an electric circuit manufactured in accordance with a predefined electric circuit design;
a memory storing data representing a unit-specific model for the electric circuit, the unit-specific model describing a frequency response between an input signal and an output signal of the electric circuit, in a frequency range, in dependence of at least one parameter affecting operation of the electric circuit; and
a compensation stage configured
to retrieve said data from the memory,
to determine a present value of the at least one parameter, and,
based on said present value and said unit-specific model, to compensate a deviation between a frequency response of said electric circuit and a reference frequency response, wherein the reference frequency response is independent of the at least one parameter,
wherein the memory stores at least data of a first type and data of a second type representing the unit-specific model,
said first type having been prepared on the basis of a plurality of frequency responses measured for a test lot of other electric circuits also manufactured in accordance with the electric circuit design, and
said second type having been prepared on the basis of a measurement of a unit-specific frequency response for the electric circuit at a certain value of the at least one parameter.

17. The signal processing device of claim 16, wherein the compensation stage comprises a sensor for measuring the at least one parameter.

18. A method of operating an electric circuit manufactured in accordance with a predefined electric circuit design, the method comprising:
obtaining data representing a unit-specific model for the electric circuit, the unit-specific model describing a frequency response between an input signal and an output signal of the electric circuit, in a frequency range, in dependence of at least one parameter affecting operation of the electric circuit;
determining a present value of the at least one parameter; and
based on said present value and said unit-specific model, compensating a deviation between a frequency response of said electric circuit and a reference frequency response, wherein the reference frequency response is independent of the at least one parameter, wherein said data includes data of a first type and data of a second type, said first type having been prepared on the basis of a plurality of frequency responses measured for a test lot of other electric circuits also manufactured in accordance with the electric circuit design, and said second type having been prepared on the basis of a measurement of a unit-specific frequency response for the electric circuit at a certain value of the at least one parameter.

19. The method of claim 18, wherein the data represents the unit-specific model as a formula, and said step of compensating a deviation between a frequency response of said electric circuit and a reference frequency response includes evaluating the formula for said present value of the at least one parameter.

* * * * *

UNITED STATES PATENT AND TRADEMARK OFFICE
CERTIFICATE OF CORRECTION

PATENT NO. : 10,192,017 B2
APPLICATION NO. : 15/569931
DATED : January 29, 2019
INVENTOR(S) : Bref et al.

Page 1 of 1

It is certified that error appears in the above-identified patent and that said Letters Patent is hereby corrected as shown below:

On the Title Page

In Column 2, Item (74), in "Attorney, Agent, or Firm", Line 1, delete "Bellerman" and insert -- Bellermann --, therefor.

In the Claims

In Column 17, Claim 11, Line 61, delete "modulator" and insert -- I/Q, modulator --, therefor.

In Column 18, Claim 14, Line 12, delete "claim 2," and insert -- claim 1, --, therefor.

Signed and Sealed this
Twenty-third Day of April, 2019

Andrei Iancu
*Director of the United States Patent and Trademark Office*